United States Patent [19]
Bridigum

[11] 3,773,151
[45] Nov. 20, 1973

[54] MOUNTING MEANS FOR TREAD BRAKES
[75] Inventor: Robert J. Bridigum, Pittsburgh, Pa.
[73] Assignee: Westinghouse Air Brake Company, Wilmerding, Pa.
[22] Filed: Jan. 25, 1972
[21] Appl. No.: 220,590

[52] U.S. Cl. ............................ 188/153 R, 188/209
[51] Int. Cl. ....................... B61h 13/22, B60t 13/10
[58] Field of Search .................. 188/33, 52, 53, 57, 188/153 R, 209

[56] References Cited
UNITED STATES PATENTS
315,973   4/1885   Strong .................... 188/153 R UX Primary Examiner—Duane A. Reger
Attorney—Ralph W. McIntire, Jr. et al.

[57] ABSTRACT

This invention relates to a tread brake unit the casing of which has formed integral therewith and at one side thereof a brake head hanger that is pivotally mounted at one end on a pin carried in the opposite jaws of a clevis that is integral with a bracket removably secured to the outboard side of an inboard-type truck side frame.

10 Claims, 5 Drawing Figures

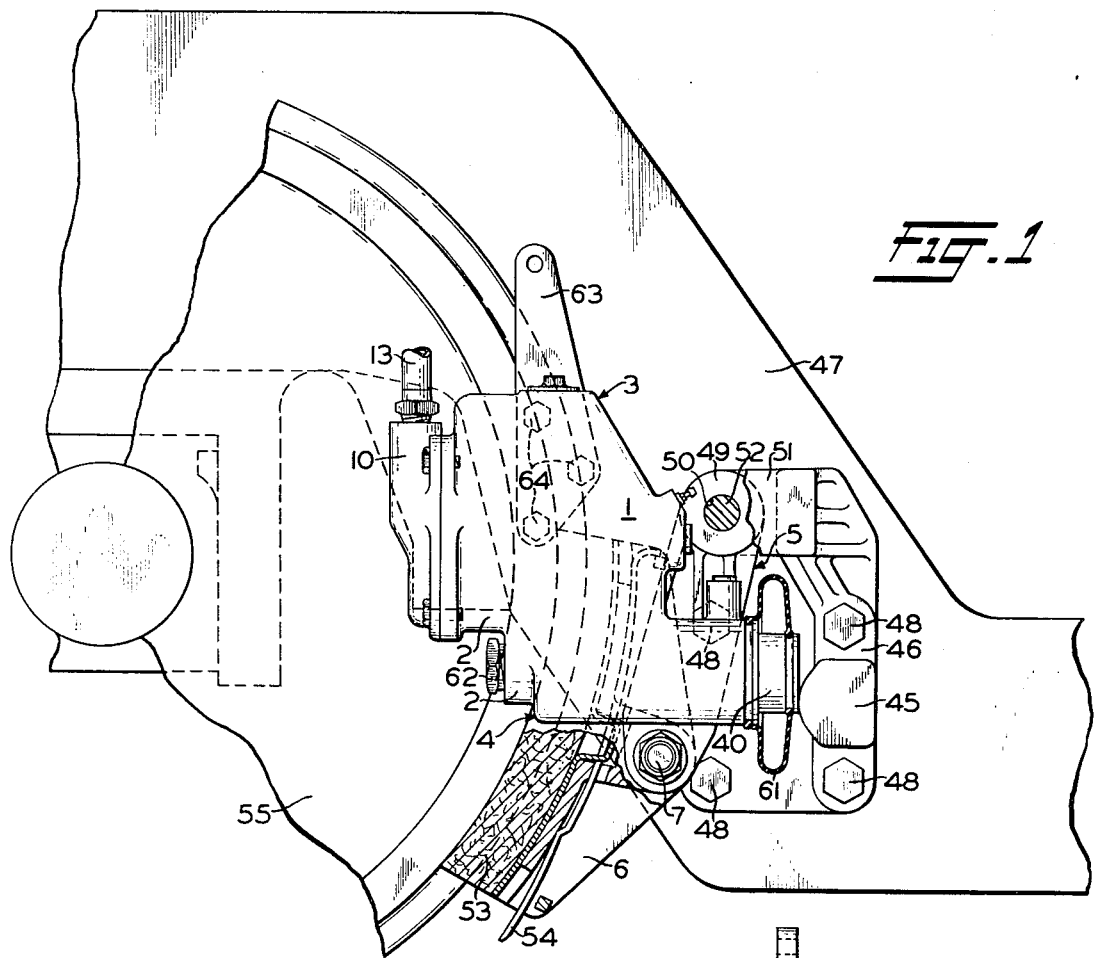
Fig. 1
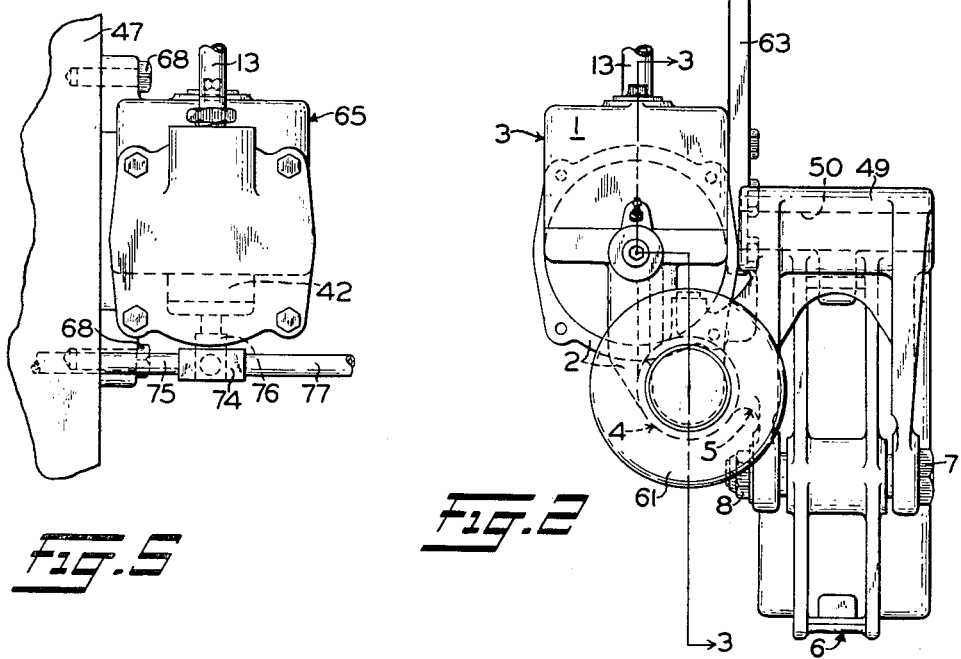
Fig. 3
Fig. 2

PATENTED NOV 20 1973 3,773,151

MOUNTING MEANS FOR TREAD BRAKES

BACKGROUND OF THE INVENTION

U.S. Pat. No. 2,926,758 issued Mar. 1, 1960, to Joseph F. Frola and assigned to the assignee of the present invention discloses a hydraulically-actuated pneumatically-controlled tread brake unit suitable for use with each individual wheel of a two-axle four-wheel railway car truck. This type of tread brake unit cannot conveniently be employed on the newer type of lightweight railway and rapid transit passenger cars due to limitations of space provided by conventional mounting arrangements. Moreover, the tread brake unit disclosed in the patent to Frola is not provided with a so-called "snow brake" wherein the brake shoe is constantly pressed against the tread surface of a corresponding wheel with sufficient force whereby the heat generated thereby prevents the accumulation of snow and ice which would, as the result of freezing thereon, render the brake unit inoperative.

Accordingly, it is the general purpose of this invention to provide a small, lightweight, compact, pneumatically-controlled hydraulically-actuated tread brake unit that embodies therein a "snow brake" and has formed integral therewith a brake head hanger which is pivotally mounted on a bracket removably secured to the outboard side of an inboard-type truck side frame.

SUMMARY OF THE INVENTION

According to the present invention, a novel pneumatically-controlled hydraulically-actuated tread brake unit is provided comprising a casing that has formed integral therewith and at one side thereof a brake head hanger having at one end a hub or boss from which extends two spaced-apart legs between which is disposed and on which is pivotally mounted a brake-shoe-carrying brake head in alignment with the tread surface of a railway car wheel. This hub is pivotally mounted between the jaws of a clevis that is integral with a bracket removably secured by suitable means to the outboard side of a truck side frame disposed on the inboard side of two wheels on the same side of the car truck.

The brake unit casing comprises two parallel cylinders the axes of which are not in common vertical plane or, in other words, are off-set, the brake head hanger being integral with that one of these cylinders that has slidably mounted therein a hydraulic-pressure-actuated piston that extends from this cylinder in the direction of a stop or boss integral with the bracket carried by the side frame. A spring interposed between the end of this cylinder and this piston is effective to bias the outer end of the piston against the boss and thereby press the brake shoe carried by the brake head against the tread surface of the corresponding wheel with a chosen degree of force thus providing a "snow brake" to prevent the accumulation of snow and ice. The other of the pair of cylinders has therein a pneumatically-actuated piston connected to a hydraulic plunger that upon the supply of air under pressure to the pneumatically-actuated piston forces a hydraulic fluid to flow to the hydraulic-pressure-actuated piston. Since the outer end of this piston is in abutting contact with the boss, this hydraulic fluid pressure acts on the casing to rock it and the brake head hanger integral therewith about their pivotal connection with the bracket in the direction to force the brake shoe carried by the brake head suspended from the hanger against the tread surface of the corresponding wheel thereby effecting a brake application on this wheel.

In the accompanying drawings:

FIG. 1 is a side elevational view of a tread brake unit suspended from or pivotally mounted on a bracket removably secured to a truck side frame, embodying one form of the invention.

FIG. 2 is an end elevational view of the brake unit of FIG. 1 shown removed from the bracket.

FIG. 5 is an end elevational view of a third embodiment of the invention wherein the single penumatically-actuated hydraulic master cylinder supplies hydraulic fluid under pressure to a pair of separate hydraulic cylinders one for each of a pair of wheels carried adjacent the ends of a railway car axle.

DESCRIPTION — FIGS. 1 TO 3

Figure 3:
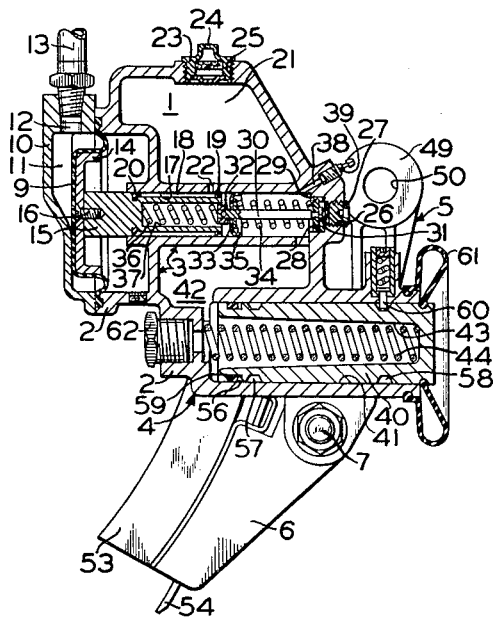
FIG. 3 is a vertical cross-sectional view of the brake unit shown in FIG. 2, taken along the line 3—3 of FIG. 2 and looking in the direction of the arrows, showing the relation between the pneumatic and hydraulic cylinders and pistons comprising the brake unit.

As shown in FIGS. 1 to 3 inclusive of the drawings, a hydro-pneumatic brake unit 1, one of which is provided for each wheel of a railway vehicle truck, comprises a casing 2 in which is housed in spaced-apart offset parallel relationship a pneumatic-pressure-actuated master cylinder portion 3 and a hydraulic wheel cylinder portion 4. As best shown in FIG. 2, the casing 2 has formed integral therewith a brake head hanger 5 on which a brake-shoe-carrying brake head 6 is pivotally mounted as by means of a bolt 7 and a nut 8.

As shown in FIG. 3, the pneumatic-pressure-actuated master cylinder portion 3 comprises an abutment which may be in the form of a flexible diaphragm 9, the outer periphery of which is clamped between the left-hand end of the casing 2 and a pressure head 10 that is secured to this casing by any suitable means (not shown). The left-hand side of the diaphragm 9 cooperates with pressure head 10 to form a pressure chamber 11 (FIG. 3) to which pneumatic pressure may be supplied through a port 12 and a pipe 13 which is connected as by means of a flexible hose (not shown) to the brake cylinder pipe of a brake control valve device of the usual air brake equipment on a railway or rapid transit car.

The rigt-hand side of the diaphram 9 abuts a diaphragm follower 14 that is secured to a plunger 15 by means such as, for example, a screw 16. The plunger 15 is slidably mounted in a counterbore 17 provided therefor in the casing 2 and has thereon an elongated peripheral annular groove 18 at the right-hand end of which is a flange having therein a plurality of arcuately arranged ports 19 two of which appear in FIG. 3, it being noted that the diameter of this flange is such that it has a sliding fit within the counterbore 17. As is also shown in FIG. 3, the plunger 15 carries, intermediate its ends and at the left-hand end of the groove 18 thereon, a packing cup 20, the outer periphery of which forms a seal with the wall surface of the counterbore 17.

As shown in FIG. 3, a hydraulic fluid sump or reservoir 21 is formed in the casing 2 and is always connected to the interior of the counterbore 17 intermediate the ends of the groove 18 by a port or orifice 22. The reservoir 21 may be filled with oil or some other suitable hydraulic fluid through a removable filling cap 23 having therein a vent hole 24, this filling cap 23 being provided with external screw threads that have screw-threaded engagement with internal screw threads formed on the wall surface of a bore 25 provided in the casing 2.

As shown in FIG. 3, the casing 2 is provided with a screw-threaded bore 26 in which is received a screw-threaded plug 27, it being noted that this bore 26 is coaxial with the hereinbefore-mentioned counterbore 17 and a counterbore 28 of smaller diameter than the counterbore 17. An annular cup-shaped piston member 29 is press-fitted into the counterbore 28 for receiving the right-hand shouldered end of a rod 30 that is provided with screw threads whereby this rod 30 is secured to the piston member 29 by a nut 31. The left-hand end of the rod 30 has an annular stop member 32 secured thereto by any suitable means. Disposed about the rod 30 is a packing cup 33 which is normally biased against the right-hand side of the stop 32 by a spring 34 that surrounds the rod 30 and is interposed between a follower 35 that abuts the packing cup 33 and the piston member 29.

The left-hand end of the stop 32 also serves as a spring seat for one end of a brake release spring 36 that is interposed between this stop 32 and the left-hand end of a bottomed bore 37 provided in the plunger 15. Accordingly, it can be seen from FIG. 3 that in the absence of fluid under pressure in the chamber 11, the spring 36 biases the diaphragm 9 and diaphragm follower 14 to the brake release position shown in which the diaphragm 9 abuts the pressure head 10, and the spring 34, via the follower 35, biases the packing cup 33 against the stop 32.

As shown in FIG. 3, opening into the counterbore 17 adjacent the right-hand end thereof is one end of a passageway 38 provided in the casing 2. The opposite end of the passageway 38 is provided with internal screw threads for receiving a bleeder screw 39 of any conventional commercially available type. This bleeder screw is provided with a hexagonal head which, when rotated by the application of a wrench thereto, operates means for effecting flow of hydraulic fluid therethrough from the interior of counterbore 17 to the exterior of casing 2.

The hydraulic wheel cylinder portion 4 comprises a piston 40 that is slidably mounted in a bottomed bore 41 provided therefor in the casing 2. The left-hand end of this bottomed bore 41 is connected to the right-hand end of the counterbore 17 by a passageway 42 formed in the casing 2.

The piston 40 is provided with longitudinal bottomed bore 43 between the end of which the casing 2 is interposed a spring 44 which constantly exerts force on this piston in the direction to bias it against a stop or thrust block 45 shown in FIG. 1. This stop 45 is formed integral with a fulcrum bracket 46 that is removably secured to the outboard side of an inboard-type truck side frame 47 by four cap screws 48 that have screw-threaded engagement with screw-threaded bottomed bores (not shown) provided therefor in the truck side frame 47.

As best shown in FIG. 2, the brake head hanger 5 has formed at its upper end a boss 49 through which extends a smooth bore 50. This boss 49 is disposed between the jaws of a clevis 51 (FIG. 1) that is formed integral with the bracket 46, there being a smooth bore provided in each jaw of this clevis for receiving a bolt 52 that extends through the bore 50 in the boss 49, this bolt 52 serving as a fulcrum upon which the brake unit 1 is rockably mounted. Thus, the spring 44 is effective to bias the right-hand end of the piston 40 against the stop 45 and rock the brake unit 1 clockwise, as viewed in FIG. 1, about the bolt 52 to press a brake shoe 53 secured to the brake head 6 by a brake shoe key 54 against the tread surface of a car wheel 55 with a light pressure which is sufficient however, to generate the amount of heat necessary to prevent the accumulation of ice and snow on and between the tread surface of the wheel and the braking surface of the brake shoe.

The piston 40 is provided with three spaced-apart circumferential grooves 56, 57 and 58, the groove 56 being adjacent the left-hand end of the piston and having therein an O-ring 59 that forms a seal with the wall surface of the bottomed bore 41 to prevent the leakage therepast of the hydraulic fluid in the passageway 42.

While the piston 40 occupies the position shown in FIG. 3, the groove 58 receives therein one end of a spring-loaded detent 60 that holds the piston 40 and the brake unit 1 in the position shown. When the brake unit 1 is removed from the bracket 46, the spring 44 will push the piston 40 out of the bottom bore 41 until the detent 60 is spring biased into the groove 57 thereby preventing the spring 44 from ejecting the piston 40 from the bottomed bore 41.

In order to prevent the accumulation of water, ice and dirt on the exterior or peripheral surface of the piston 40 and the entrance thereof to the interior of the bottomed bore 41, a resilient boot 61 constructed of some suitable material such as, for example, rubber, surrounds the right-hand end of the piston 40. The opposite ends of the boot 61 are provided with beads which fit respectively into grooves provided therefor in the piston 40 and in the casing 2 as shown in FIGS. 1 and 3.

As shown in FIGS. 1 and 3, the casing 2 is provided with a screw-threaded bore in which is received a screw-threaded plug 62, the removal of which enables a repairman to drain the hydraulic fluid from the reservoir 21, counterbore 17, passageway 42 and that portion of the bottomed bore 41 on the left-hand side of the piston 40 prior to replacing any defective element in the master cylinder portion 3 or the wheel cylinder portion 4.

In order to provide in customary fashion for operation of the brakes by hand brake means, a hand brake lever 63 is secured to the casing 2 of the brake unit 1 by three cap screws 64. The upper end of the hand brake lever 63 may be connected as thorugh a cable or chain and a system of pulleys or a bell-crank to the hand brake wheel which is located at one end of a railway car.

OPERATION — FIGS. 1 TO 3

Let is be assumed that the filling cap 23 has been removed to permit filling of the reservoir 21 with a suitable hydraulic fluid and that the flow of this fluid through the port 22 and past the packing cup 33 has completely filled the counterbore 17, the passageway 42 and that portion of the bottomed bore 41 on the left-hand side of the O-ring 59. As hereinbefore-stated, the spring 44 is effective to bias the right-hand end of the piston 40 against the stop 45 and the brake shoe 53 against the tread surface of the wheel 55, as shown in FIG. 1 of the drawings.

Let is be assumed that the chamber 11 in the casing 2 is void of fluid under pressure, that the spring 36 has moved the plunger 15, follower 14 and diaphram 9 to the position shown in FIG. 3 in which the left-hand side of the diaphragm 9 abuts the pressure head 10, and that the spring 34 has moved the follower 35 and the packing cup 33 to the position shown in which this cup 33 abuts the stop member 32.

In operation, when it is desired to effect a brake application, fluid under pressure is admitted to the chamber 11 (FIG. 3) through the port 12 and pipe 13 which is connected to the brake control valve device of the usual air brake equipment on railway or rapid transit passenger cars. Fluid under pressure thus supplied to the chamber 11 is effective to deflect the diaphragm 9 and move the follower 14 and plunger 15 in the direction of the right hand, as viewed in FIG. 3, against the yielding resistance of the spring 36. After the plunger 15 is thus moved a short distance in the direction of the right hand, the flange at the right-hand end of groove 18 is moved into contact with the left-hand side of the packing cup 33 so that the continuing movement of the plunger 15 moves this packing cup 33 therewith against the yielding resistance of the spring 34.

This movement of the plunger 15 and packing cup 33 will cause the hydraulic fluid on the right-hand side of this packing cup to force the periphery or skirt portion of this cup against the wall surface of the counterbore 17 to form a seal therewith to thus trap the hydraulic fluid on the right-hand side of the cup 33 to prevent the escape of this fluid back into the reservoir 21.

As the plunger 15 and packing cup 33 continue to be displaced in the direction of the right hand in response to the supply of fluid under pressure to the chamber 11, the hydraulic fluid trapped in the counterbore 17 on the right-hand side of the packing cup 33 will be forced from this counterbore through the passageway 42 to the left-hand end of the bottom bore 41. Since a hydraulic fluid is incompressible, a build-up of pressure will occur on the left-hand side of the piston 40 and on the wall of the casing 2 at the left-hand end of the bottomed bore 41.

As shown in FIG. 1 of the drawings, the righr-hand end of the piston 40 abuts the stop 45 that is integral with the bracket 46 secured to the side frame 47 by the cap screws 48 so that this piston 40 cannot move in the direction of the right hand. Accordingly, the force exerted on the casing 2 by the hydraulic fluid present in the passageway 42 and in the bottomed bore 41 on the left-hand side of the O-ring 59 acts in the direction to rock the casing 2, the brake head hanger 5 that is integral with this casing 2, the brake head 6 and the brake shoe 53 clockwise, as viewed in FIGS. 1 and 3, about the bolt 52.

As hereinbefore-explained, the spring 44 maintains the braking surface of the brake shoe 53 in contact with the tread surface of the wheel 55 at this time. Therefore, until the shoe 53 starts to wear away, no clockwise rocking of the casing 2, brake head hanger 5, brake head 6 and brake shoe 53 can occur. Accordingly, it is apparent that the force exerted on the casing 2 by the hydraulic fluid is effective to apply a braking force to the brake shoe 53 for effecting a brake application on the wheel 55.

In order to maintain the brake shoe 53 against the

In order to maintain the brake shoe 53 against the tread surface of the wheel 55 as the shoe 53 wears away, the brake unit 1 will be rocked in a clockwise direction, as viewed in FIG. 1, about the pivot constituted by the bolt 52 that is carried by the jaws of the clevis 51 and extends through the bore 50 in the boss 49 that is integral with the brake head hanger 5 which in turn is integral with the casing 2 of the brake unit 1.

As shown in FIG. 1, the stop 45 abuts the right-hand end of the piston 40 near the lower end thereof. Accordingly, it is apparent that as the brake shoe 53 wears away and the brake unit 1 is rocked clockwise about the bolt 52 the hydraulic fluid acting on the left-hand end of the piston 40 maintains the right-hand end of this piston against the stop 45 but that the point of contact between the stop 45 and the right-hand end of this piston 40 moves upward from that shown in FIG. 1 since the longitudinal center line of this piston becomes more inclined to the horizontal as the amount of brake shoe wear increases.

From the forgoing, it is apparent that the brake unit 1 does not require a slack adjuster mechanism to compensate for wearing away of the brake shoe 53.

Upon a subsequent release of fluid under pressure from the chamber 11 for effecting a brake release, spring 36 will return the plunger 15, diaphragm follower 14 and diaphram 9 to the position shown in FIG. 1. As the plunger 15 is thus returned to the position shown, hydraulic pressure on the packing cup 33 is reduced, whereupon the spring 34 is rendered effective to move the follower 35 and this packing cup in the direction of the left hand, as viewed in FIG. 3. At this time the spring 44 is effective to maintain the right-hand end of the piston 40 in contact with the stop 45 and the braking surface of the brake shoe 53 in contact with the tread surface of the wheel 55 so that the piston 40 is not returned to the position it occupied prior to wear of the brake shoe 53 but remains in the position to which it was moved as a result of the wear of shoe 53. Theerefore, as the plunger 15 and the packing cup 33 are moved in the direction of the left hand, as viewed in FIG. 3, by the respective springs 36 and 34, a partial vacuum is created within the counterbore 17 and on the right-hand side of the packing cup 33. Since hydraulic fluid can flow from the reservoir 21 to the interior of the counterbore 17 on the left-hand side of the packing cup 33 via the port 22, the hydraulic fluid in the counterbore 17 and on the left-hand side of the packing cup 33 will deflect the outer periphery of this cup away from the wall surface of the counterbore 17 and flow therepast into that portion of the counterbore 17 on the right-hand side of the packing cup 33 to maintain the volume between the right-hand side of the packing cup 33 and the left-hand end of the piston 40 completely filled with hydraulic fluid notwithstanding the wearing away of the brake shoe 53 while the brake application was in effect.

For the foregoing, it is apparent that upon effecting a brake release subsequent to the wearing away of the brake shoe 53 while a brake application was in effect, the volume between the packing cup 33 and the piston 40 is increased and that this additional volume is filled with hydraulic fluid from the reservoir 21. Consequently, when fluid under pressure is again supplied to the chamber 11, a brake application on the wheel 55 will be effected in the same manner as hereinbefore described.

When the brake shoe 53 has completely worn out and is to be replaced with a new shoe, it is necessary to return the piston 40 to its original position within the bottom bore 41 since the thickness of the new shoe is greater than that of the worn shoe.

It will be remembered that as the brake shoe 53 wore away, the piston 40 was moved in the direction of the right hand, as viewed in FIG. 3, relative to the casing 2, and hydraulic fluid was supplied to the volume extending between the right-hand side of the packing cup 33 and the left-hand end of the piston 40 upon effecting a brake release subsequent to the wearing away of the shoe, it being noted that the quantity of fluid supplied to this volume upon effecting each brake release corresponds to the amount of wear of the shoe 53 occurring while the prior brake application was in effect. Accordingly, for the piston 40 to be returned to its original position within the bottomed bore 41, it is necessary that some of the hydraulic fluid filling the volume extending from the right-hand side of the packing cup 33 to the left-hand end of the piston 40 be removed therefore.

To decrease the volume extending between the right-hand side of the packing cup 33 and the left-hand end of the piston 40, a workman will either apply a wrench to the hexagonal head of the bleeder screw 39 and thereafter rotate this head to operate the means embodied in this screw for effecting flow of hydraulic fluid therethrough from the interior of the counterbore 17 to the exterior of the casing 2 via the passageway 38, or he will loosen the screw-threaded plug 62 within the screw-threaded bore provided therefor in the casing 2 to permit a slow flow of hydraulic fluid from the interior of the bottomed bore 41 to the exterior of the casing 2 past these screw threads, depending upon which is the more accessible, and bleed screw 39 or the screw-threaded plug 62.

Assuming that the plug 62 is the more accessible, subsequent to thus loosening the screw-threaded plug 62, the workman will insert the tapered end of a crowbar between the braking surface of the worn brake shoe 53 and the tread surface of the wheel 55 and thereafter move the crowbar sidewise in the direction to rock the brake shoe 53, brake head 6, brake head hanger 5 and casing 2 counterclockwise, as viewed in FIG. 1, about the bolt 52 until there is sufficient clearance between the brake head 6 and the tread surface of the wheel 55 to receive a new brake shoe, it being noted that as the brake unit 1 is thus rocked counterclockwise, the casing 2 is moved relative to the piston 40, the right-hand end of which abuts the stop 45, so that this piston forces the hydraulic fluid in the bottomed bore 41 and on the left-hand side of the O-ring 59 to flow past the screw threads on the now loosened plug 62 to the exterior of the casing 2.

When the brake unit 1 has thus been rocked counterclockwise about the bolt 52 far enough to provide sufficient clearance between the brake head 6 and the tread surface of the wheel 55 for the insertion of a new brake shoe, the brake unit 1 will be anchored in this position by any suitable means.

The workman can now remove the worn brake shoe 53 by striking the lower end of brake shoe key 54 several blows with a hammer, after which the key 54 can be withdrawn from the brake shoe 53 and brake head 6 by hand.

Subsequent to removal of the worn brake shoe 53, a new brake shoe can be secured to the brake head 6 by the brake shoe key 54 which was previously removed from the worn shoe 53.

The anchoring means holding the brake unit 1 in the position to which it was rocked by the crowbar may now be removed whereupon the spring 44 is rendered effective to bias the right-hand end of the piston 40 against the stop 45 and the braking surface of the new brake shoe against the tread surface of the wheel 55 with sufficient force to cause the generation of the amount of heat required to prevent the accumulation of ice and snow thus providing a so-called "snow brake."

DESCRIPTION — FIG. 4

Figure 4:
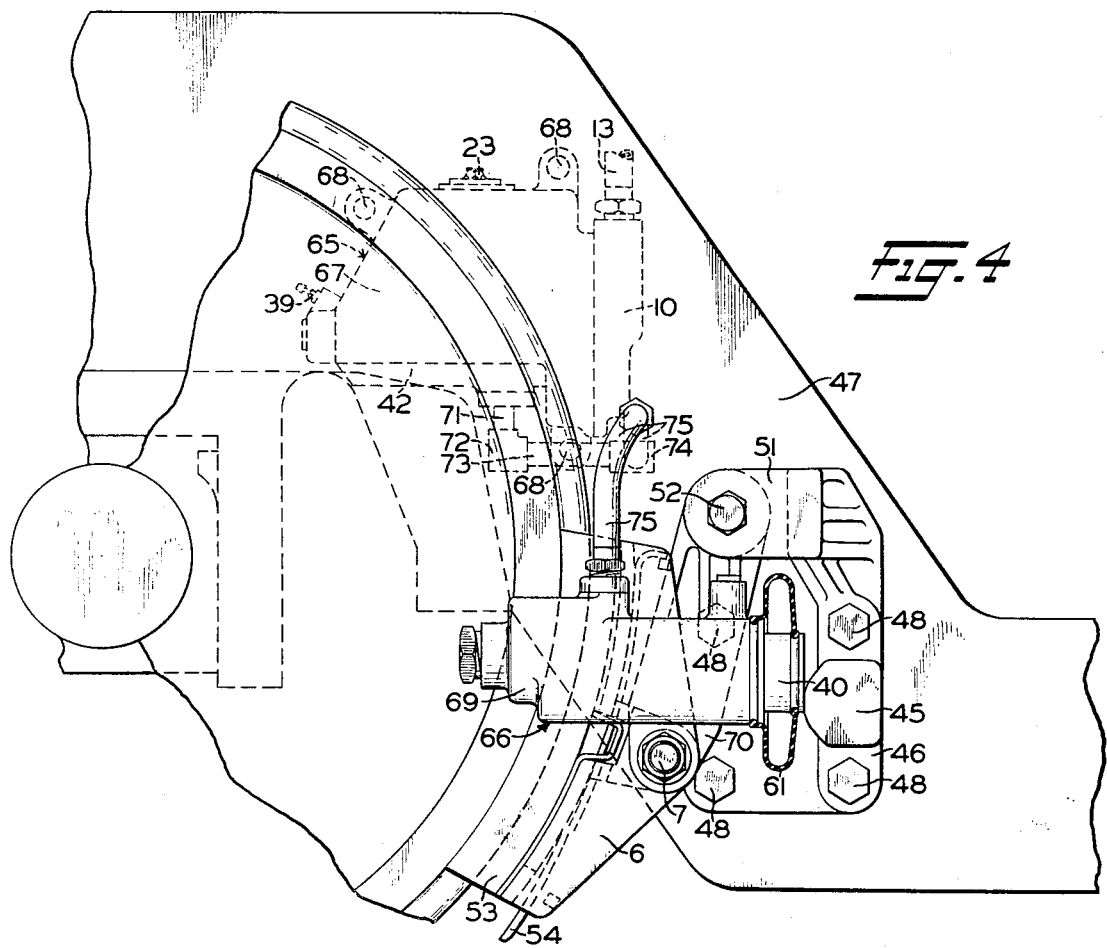
FIG. 4 is a side elevational view of a brake unit constructed in accordance with a second embodiment of the invention, the two cylinders being separate and connected by a pipe through which hydraulic fluid flows from one cylinder to the other.

In FIG. 4 of the drawings, there is shown a side elevational view of a brake apparatus constructed in accordance with a second embodiment of the invention. According to this second embodiment of the invention, a hydro-pneumatic master cylinder or fluid motor 65 and a hydraulic wheel cylinder portion or fluid motor 66 are not embodied in a single casing as are the master cylinder portion 3 and the wheel cylinder portion 4 of the brake unit 1 constituting the first embodiment of the invention. According to this second embodiment of the invention, the master cylinder portion 65 is embodied in a casing 67 which is secured to the inboard side of the truck side frame 47 by three cap screws 68, and the wheel cylinder portion 66 is embodied in a separate casing 69 that has formed integral with a brake head hanger 70 that emables this wheel cylinder portion 66 to be pivotally mounted on the outboard side of the truck side frame 47 in the same manner as is the brake unit 1 shown in FIG. 1.

The internal construction of the master cylinder portion 65 is substantially the same as that of the master cylinder portion 3. Likewise, the internal construction of the wheel cylinder portion 66 is substantially the same as that of the wheel cylinder portion 4. Accordingly, like reference numerals have been used to designate the structure shown in FIG. 4 which is identical to that shown in FIG. 1. Only such features of the structure and operation of the embodiment of the invention shown in FIG. 4 which differ from that of the embodiment of FIG. 1 will be hereinafter described.

As shown in FIG. 4, connected to one end of the passageway 42 in the master hydraulic portion 65 is one end of a short pipe 71 the opposite end of which is connected to one outlet of an elbow fitting 72. Connected to the other outlet of this elbow fitting 72 is one end of a pipe 73 the opposite end of which is connected to one inlet of a pipe tee 74 the other inlet of which in this second embodiment of the invention is closed by any suitable means. Connected to the side outlet of this pipe tee 74 is one end of a curved pipe 75 that extends through a suitable opening provided therefor in the truck side frame 47 and has its other end connected to a port (not shown) in the casing 69 of the wheel cylinder portion 66, it being understood that this port opens into a bottomed bore in the casing 69 that corresponds to the bottomed bore 41 shown in FIG. 3. A piston, corresponding to the piston 40, is slidably mounted in this bottomed bore, the right-hand end of which piston abuts the stop 45, as shown in FIG. 4.

The operation of the master cylinder portion 65 and the separate wheel cylinder portion 66 shown in FIG. 4 is the same as that of the master cylinder portion 3 and the wheel cylinder portion 4 of the brake unit 1 and need not be repeated.

DESCRIPTION — FIG. 5

In FIG. 5 of the drawings, there is shown how the master cylinder portion 65 of FIG. 4 can be connected to a pair of wheel cylinder portions such as the wheel cylinder portion 66, one for each of two wheels (not shown) secured to the opposite ends of a railway truck axle (not shown).

As shown in FIG. 5, the master cylinder portion 65 is secured to the inboard side of the left-hand truck side frame 47 by the cap screws 68, only two of which appear in FIG. 5. As shown in FIG. 5, the passageway 42 in the master cylinder portion 65 is connected to the pipe tee 74 by a pipe 76. The left-hand end of the pipe tee 74 is connected by the pipe 75 that extends through a suitable opening in the left-hand truck side frame 47 to a wheel cylinder portion (not shown) for the wheel at the left-hand end of the car axle. The right-hand end of the pipe tee 74 is connected by a pipe 77 that extends through a suitable opening in the right-hand truck side frame (not shown) to a wheel cylinder (not shown) for the wheel at the right-hand end of the car axle. Thus, operation of the master cylinder portion 65 in the same manner as hereinbefore described for the master cylinder portion 3 of the first embodiment of the invention effects simultaneous operation of two wheel cylinder portions, one for each wheel of a pair of wheels secured to the opposite ends of a railway car axle.

Having now described the invention, what I claim as new and desire to secure by Letters Patent, is:

1. Brake apparatus for applying a braking force to at least one wheel of a railway car truck having at least one side frame, said brake apparatus comprising, in combination:
   a. fulcrum means removably secured to said at least one side frame,
   b. hydraulically actuated fluid motor means for effecting a brake application on at least one wheel of said railway car truck, said fluid motor means having formed integral therewith brake head hanger means pivotally mounted on said fulcrum means,
   c. brake-shoe-carrying brake head means pivotally mounted on said brake head hanger means,
   d. hydro-pneumatic master fluid motor means embodying a hydraulic fluid reservoir and means for supplying hydraulic fluid under pressure therefrom upon the supply of pneumatic pressure thereto, and
   e. conduit means through which said hydraulic fluid under pressure is conveyed to said hydraulically actuated fluid motor means to cause a brake application.

2. Brake apparatus, as recited in claim 1, further characterized in that said hydraulically actuated fluid motor means is removably secured to the inboard side of said at least one side frame and said hydro-pneumatic master fluid motor means is removably secured to the outboard side of said at least one side frame, and said conduit means extends through said at least one side frame from said inboard side to said outboard side.

3. Brake apparatus, as recited in claim 1, further characterized in that said fulcrum means comprises stop means, and said hydraulically actuated fluid motor means comprises cylinder means integral with said brake head hanger means and having disposed therein piston means in constant abutting relationship with said stop means whereby said cylinder means is effective to transmit a brake applying force to said at least one wheel upon the conveyance of said hydraulic fluid under pressure through said conduit means to said hydraulically actuated fluid motor means.

4. A brake unit for applying a braking force to a wheel of a railway car truck having a side frame, said brake unit comprising:
   a. a fulcrum brake removably secured to said side frame and having a stop formed integral therewith,
   b. a casing having:
      i. a first bore,
      ii. a second bore in constant communication with said first bore, the axes of said bores being parallel and off-set one from the other,
      iii. a brake head hanger integral with said casing for pivotally mounting said casing on said fulcrum bracket, and
      iv. a reservoir filled with a fluid medium and in constant communication with said first bore,
   c. a brake-shoe-carrying brake head pivotally mounted on said hanger,
   d. a piston slidably mounted in said second bore in said casing,
   e. biasing means interposed between said piston and said casing for respectively biasing said piston against said stop and said casing in the direction to cause the brake shoe carried by said brake head to exert a limited braking force on said wheel, and
   f. means operative in said first bore and movable in opposite directions responsively to application and release of pneumatic pressure to one side thereof to apply pressure to the fluid in said bores whereby the resulting fluid pressure forces acting in opposite directions on said piston and said casing is transmitted via said casing and brake-shoe-carrying brake head to said brake shoe to exert an additional braking force on said wheel.

5. A brake unit, as recited in claim 4, further characterized in that said fulcrum bracket comprises a clevis for pivotally mounting thereon said brake head hanger, said clevis and said stop being so spaced one from the other that upon pivotally mounting said hanger on said clevis, said piston is in aligment with said stop.

6. A brake unit, as recited in claim 4, further characterized in that said casing is provided with a plurality of bleeder means for releasing fluid from said bores selectively operable accordingly as the accessibility of one of said bleeder means exceeds that of the remainder.

7. A brake unit, as recited in claim 4, further characterized in that said brake head hanger is so off-set from said bores in said casing that said brake-shoe-carrying brake head carried thereby is in alignment with said wheel while the remainder of said casing is disposed on the outboard side of said wheel.

8. A brake unit, as recited in claim 4, further characterized in that said brake head hanger and said reservoir are so off-set and arranged as to enable said hanger to be pivotally mounted on said fulcrum bracket, and in that, when so pivotally mounted, said reservoir is disposed outboard of said wheel.

9. A brake unit, as recited in claim 5, further characterized in that said means operative in said first bore comprises:
   a. a member disposed coaxial therewith in said first bore, one end of said member carrying a stop and the other end being anchored to said casing,
   b. resilient means slidably mounted on said member and so engaging the wall surface of said first bore as to provide a one-way flow from one side of said means to the other,
   c. biasing means disposed about said member and interposed between said casing and said resilient means for normally biasing said resilient means against said stop,
   d. a plunger slidably and sealably mounted in said first bore on the side of said stop opposite said resilient means, and
   e. pneumatically actuated means for simultaneously moving said plunger and said resilient means against the yielding resistance of both of said biasing means in the direction to cause said resilient means to prevent flow from said other side thereof to said one side and apply pressure to the fluid in said bores between said resilient means and said piston whereby the resulting fluid pressure forces on said piston and said casing effect a brake application.

10. A brake unit, as recited in claim 4, further characterized by a lever secured to said casing, said lever being effective upon manual application of force to said lever to transmit a brake applying force through said casing and said brake-shoe-carrying brake head to said brake shoe to cause a brake application on said wheel.

* * * * *

UNITED STATES PATENT OFFICE
CERTIFICATE OF CORRECTION

Patent No. 3,773,151       Dated November 20, 1973

Inventor(s) Robert J. Bridigum

It is certified that error appears in the above-identified patent and that said Letters Patent are hereby corrected as shown below:

Column 10, line 15, "brake" should be --bracket--

Column 11, line 1, "5" should be --4--

Signed and sealed this 23rd day of July 1974.

(SEAL)
Attest:

McCOY M. GIBSON, JR.
Attesting Officer

C. MARSHALL DANN
Commissioner of Patents